United States Patent [19]
Cronin

[11] 3,950,058
[45] Apr. 13, 1976

[54] PROGRAMMABLE WIRING SYSTEM AND JUNCTION BOX FOR USE THEREIN

[75] Inventor: Michael J. Cronin, Sherman Oaks, Calif.

[73] Assignee: Lockheed Aircraft Corporation, Burbank, Calif.

[22] Filed: Nov. 5, 1973

[21] Appl. No.: 413,166

[52] U.S. Cl. ............................................. 339/75 M
[51] Int. Cl.² ......................................... H01R 13/54
[58] Field of Search..... 339/18 R, 18 B, 18 C, 18 P, 339/66 M, 75 M, 75 MP, 17 LM, 17 M

[56] References Cited
UNITED STATES PATENTS

| | | | |
|---|---|---|---|
| 3,302,065 | 1/1967 | Karol et al. ....................... | 339/18 B |
| 3,581,268 | 5/1971 | Akst ................................. | 339/18 R |
| 3,594,698 | 7/1971 | Anhalt .............................. | 339/75 M |
| 3,701,964 | 10/1972 | Cronin ............................. | 339/18 C X |

FOREIGN PATENTS OR APPLICATIONS
1,239,087  7/1960  France ........................... 339/18 B Primary Examiner—T. H. Tubbesing
Attorney, Agent, or Firm—Billy G. Corber; Lowell G. Turner

[57] ABSTRACT

The invention discloses a new method of interconnecting a wiring system with an electrical junction box system. The junction box may be interfaced with the input wiring to the box by means of commercially available connectors. Internal wiring within the box is accomplished by means of a mother board carrying zero insertion force connectors and a matrix board which carries a customized interconnect program. The programmable matrix board is prefabricated and is insertable and removable to permit easy modification of the interconnect system.

32 Claims, 8 Drawing Figures

PROGRAMMABLE WIRING SYSTEM AND JUNCTION BOX FOR USE THEREIN

This invention relates to improvements in complex wiring systems, and particularly to improvements in the installation of such wiring systems in aircraft.

Complexity exists where there are large amounts of wire, and most such installations share the problems in aircraft for which the invention was specifically developed. These problems stem basically from the fact that such systems are inflexible to change and unwieldy in installation; i.e., they suffer from a lack of pre-planning. Additionally, these systems do not allow for any pre-wiring prior to in situ work using the detailed electrical drawings. The invention solves these problems by providing a viable wiring program that can be inserted into each of the junction boxes.

Other problems in such prior systems relate to the fact that in trouble shooting, or checking wiring, connectors were removed many times and in consequence became exposed to damage and deterioration. Pre-fabrication of wiring harnesses made it extremely difficult to add any new wires to accommodate any revisions to the equipment in the vehicle. Another problem is the fact that in aircraft wiring systems the electrical harnesses were constructed christmas tree fashion, with many wire break-outs, requiring termination in the aircraft. This results in thousands of terminations being made in situ in a constricted space environment. These wiring installation problems have been compounded in the large commercial and military aircraft where there may be as much as 800,000 feet of wire.

All of these problems are solved in the invention wiring system and junction boxes. The invention also produces new and additional features and advantages not heretofore obtainable in the prior art.

Of course, junction boxes are generally old. However, prior boxes invariably were "hard-wired"; i.e., the wiring was dedicated to the initial demand, and thus there was little or no capability for growth or change. Further, the inside of such prior junction boxes became a "rat's nest" of jumbled wires which produced great problems in maintenance and checking of the circuitry passing therethrough.

The invention system is built largely upon the concept of providing an arterial system of wiring in the vehicle and providing quick and easy flexibility both for change and for growth in the invention junction boxes.

In use, prefabricated internally wired invention junction boxes are placed at all strategic locations in the aircraft or other system, then wiring harnesses, terminated with conventional connectors, are interfaced with the junction boxes. These wiring harnesses are coded and prefabricated prior to installation. Futher, to allow for future growth, spare wires beyond the immediate demand are included in the harnesses. In this manner, the problems in prior dedicated wiring systems are alleviated, and growth and change are easily accommodated.

One of the most significant improvements in the art accomplished by the invention is this ability to terminate wiring harnesses with conventional connectors and to interface them with the previously installed invention junction boxes. Thus, these portions are entirely prefabricated without concern for the complex interconnects to be defined later, when the electrical drawings are detailed and the program means inserted in the boxes. When the harnesses and boxes are installed, such as in an airplane, the wiring arteries or "nervous system" of the airplane is complete. As a part of the wire identification system it is only necessary to record what particular wire connects to what particular pin on the junction box connectors. Then, the wire interconnect program, inside the box, is determined by a "wire-list" which defines which pin connects to another pin or pins inside the box. The wire list may therefore be used by technicians in the future for checking, adding, deleting, and repair of the circuits. As previously stated, the junction boxes and harnesses will include excess wire capacity, to accommodate additional equipment or equipment updates. Since the wiring from the conventional connectors (on the outside of the box) to the wiring to the internal connectors is consistently the same, it is evident that the same junction box can be used at different locations and the only difference between one box and another is the discrete interconnect program that is inserted by means of the matrix board.

It can be seen therefore that many advantages reside in the junction box including that of using a modular, building block, approach to wiring systems. The invention is simple and makes use of a particular newly-available connector in combination with any one of a number of several well-developed and commercially-available program techniques and connectors. The wiring capacity of each modular juntion box is optional and may be designed to provide 500 to 1000 wiring points, or even more.

The connector used is of the zero insertion force (herein called ZIF) variety; i.e., it includes a means of permitting a low joining force contact of two sets of terminals and a means of later bringing them firmly together to thereby make both a proper electrical connection as well as a strong mechanical connection. The particular ZIF connector used in the successful prototype shown in the drawings utilizes a shaft to operate a cam which in turn operates a dual plate carrying two sets of pin contacts. The mating terminals are carried on the matrix board and act as the fixed terminals. The normal mating half of the ZIF connector which carries fixed contacts is not used in the invention. Electrical connection and mechanical locking of the matrix board to the ZIF connectors is accomplished by rotating the shafts of the ZIFs. Since there is no insertion force, literally hundreds of terminal sets or circuits can be made simultaneously, and once locked up, significant holding forces are generated, adequate even for use in vehicles such as aircraft which have high standards.

The invention achieves its versatility by using a mother board in the box on which are discretely mounted a plurality of such ZIF connector halves or receptacles having the moving parts. The operating shafts of the ZIF halves extend through clearance holes in the matrix board to allow access from the top side. The matrix board may be simply a flat piece of material, having terminals on one side adapted to mate with the terminals in the ZIF halves on the mother board below. On the opposite side of the matrix board the connector terminals comprise means to permit programmed interconnections between the various terminals. In consonance with the policy to provide additional wires in the harnesses, additional contacts will be provided for the programmed interconnect means on the mating board; however, the connections between the conventional connectors and the ZIF connectors will be fully wired. The fact that all wiring contacts are directly exposed at the top of the programmed surface of the matrix board, permits very significant versatility and advantage over all prior systems. Removal of one programmable matrix board and replacing it with another is simply accomplished by unlocking the ZIF shafts, removing the board, and replacing it with the new board; the shafts are then relocked.

The invention includes a number of other advantageous features in the combination. In the prototype, the matrix board directly underlies the cover of the box, and the underside of the cover includes ZIF operating shaft receiving means which serve to provide additional rigidity in use, and which also provides a safety interlock to prevent putting the lid on the box unless all the ZIF operating shafts are in the locked position.

The invention has a number of advantages which stem from the inherent individual natures of various aspects of the junction box. For example, the upper side of the matrix board, which receives the interconnect program, can be configured in many different ways. These termination points can be conventional square or rectilinear pins to receive wrapped wire connections which is a highly developed and widely accepted technique. alternatively, the programming could be done with specially made flat terminal heads that cooperate with the so-called "stitch welding" process and which, like the wire wrap process, can be wired by a numeric-controlled machine. Stitch-weld offers the advantages of a low-profile board and one that is probably less prone to RF interference problems. Similarly, the programming can be done with jacks or crimp type connectors, which slide over the matrix board pins, or any other suitable wire termination means. The invention has the versatility to accommodate virtually any means of programming on the matrix board.

The programming on the matrix board can be accomplished by the use of any of the presently available conventional wiring techniques, and by future wiring techniques as they become available. For example, all the various automated wiring techniques including the welding types such as laser welding, resistance welding, spotwelding, and percussion welding, could be used.

The invention also lends itself to automated testing of all the circuits passing through the box. For example, a test adapter could be designed to fit atop the pins of the matrix board, or the matrix board could be replaced by the test adapter. This capability of bringing automated techniques, both to programming and to checking, in complex wiring systems, is possible with the invention, where heretofore only hand, slow, error-prone, methods were used. This is a substantial step forward in the art that is offered by the present invention.

Similarly, the invention has great versatility in accommodating any sort of and combinations of wiring interfaces inside the junction box. The constructed prototype used round connectors and conventional wires between the external connectors and the ZIFs on the mother board. It would be a pedestrian change to utilize flat cables or flexible printed circuits between these electrical components. Along this same line, the invention junction box can accommodate any sort of combinations of input wiring. For example, it might be desired in particular installations that the junction box be located at the interface between a flat wiring system and a conventional wiring system. In other cases, if conventional wiring harnesses were themselves terminated with ZIF connectors, these could be directly connected to the ZIF mother board. Again, the advantage of the invention resides in its versatility and the fact that its intrinsic features, particularly the matrix board, are completely independent of the input wiring to the junction box.

The programmable aspect of the matrix board epitomizes the invention's versatility and produces many of its advantages over the prior art. Further, the program matrix board includes means, in cooperation with the mother board, to visually indicate its state of modification; the same pins serve to mechanically polarize the interface so that an unmodified board cannot be inserted in a junction box where the input wiring has been revised, and vice versa, and the like.

The matrix board of the prototype is made of relatively thin material, carries the terminal means, registering openings with the ZIF operating members, means to register it into the box and onto the mother board, the program means, and various indica. As changes are required, an updated and revised interconnect program can be accomplished on a new matrix board while the aircraft is actually flying. That is, the engineering changes are accomplished on one or more new boards by means of new programming thereon, the aircraft meanwhile continuing in its normal service. The new boards may be prepared in a controlled environment such as the service shops, and then, very quickly, in one or two minutes, the matrix boards can be changed when the aircraft is available. The actual changes and/or additions to the entire installation (the whole aircraft) are thereby effectively "instantly" accomplished.

Thus there is provided a system and wiring junction of the character described which is simple in concept and in operation, virtually maintenance free, easy to check, fool proof in use, highly versatile, readily amenable to expansion, achieves great strides forward in its art, and yet is practical and efficient to a high degree in use.

The above and other advantages of the invention will be pointed out or will become evident in the following detailed description and claims, and in the accompanying drawing also forming a part of the disclosure in which:

Figure 1:
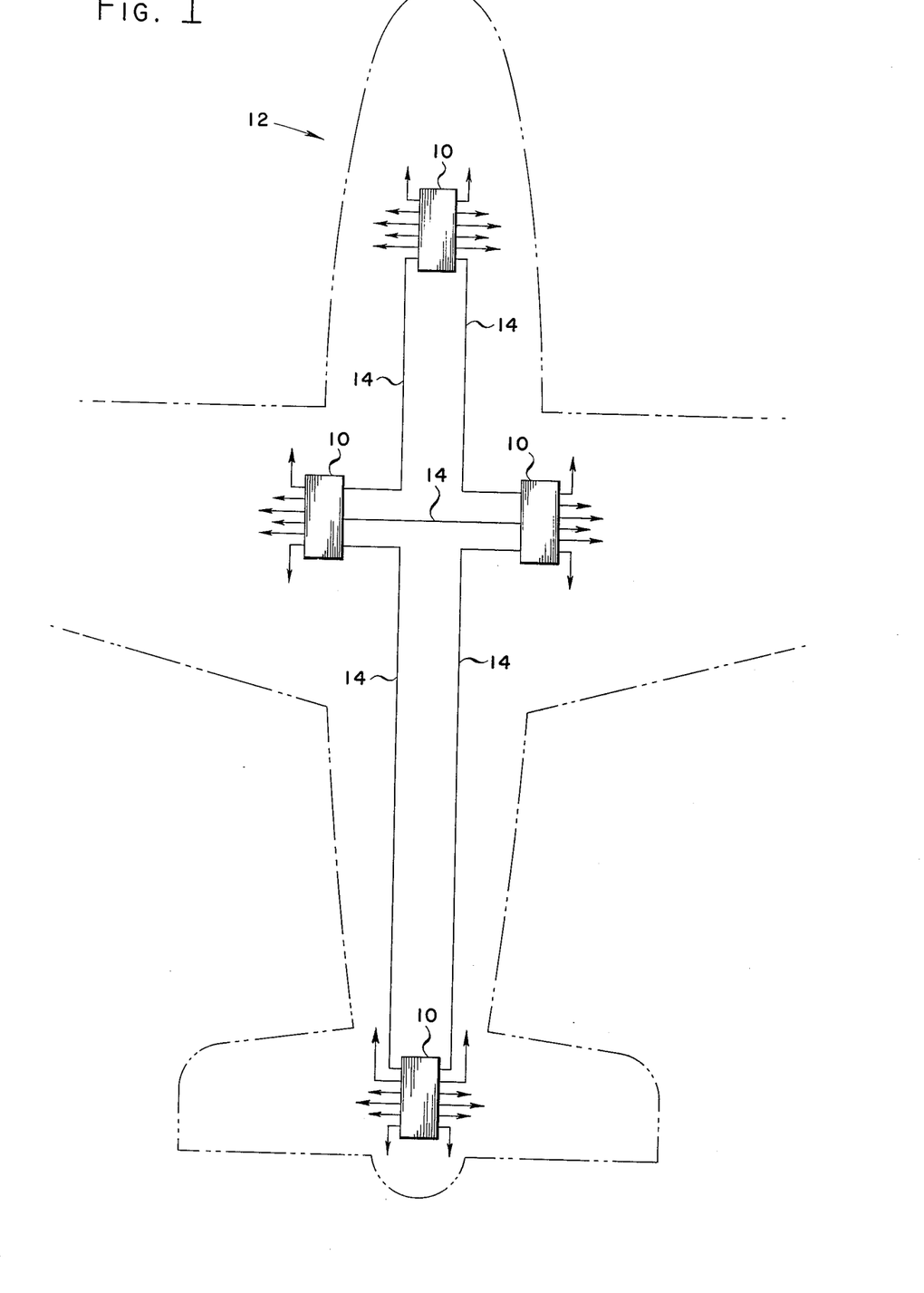
FIG. 1 is a schematic diagram of the invention system installed in an aircraft.

Referring now in detail to the drawings, a plurality of junction boxes 10 are disposed in an aircraft 12 in a double ring arrangement. That is, the four junction boxes 10 are wired together by cables 14 in two continuous and joined "circular" paths. The forward box 10 serves the various points of use at the flight deck, the aft junction box serves facilities in the empennage, the side junction boxes serve the electrical load center, which is typically midship, and the wiring running to and from the wings. The two side boxes are known in the art as wing root boxes.

In building a system such as shown in FIG. 1, the aircraft designers would determine by historical or empirical knowledge, the total number of wires required to interconnect strategic parts of the aircraft. This wiring would also include an additional number of wires for redundancy and to provide capacity for growth and changes. Cables 14 of this predetermined number of individual conductors would then be laid between the appropriate junction boxes 10. The exact nature of such cables is not a material part of the invention; i.e., they could be flat cables, individual conductors, multiconductors, prefabricated harnesses, and the like, and combinations of such conductors. It is an enormous advantage that the laying in of these cables in the aircraft is done without regard to what points of use or what particular facilities are being connected together. Selection of a particular conductor for a particular use is made later, and it can be changed at any time simply by appropriate changes via the programmable matrix board. There is significant benefit in installing these cables prior to the availability of the knowledge as to where all these wires will connect. Again, by statistical evaluation of current and voltage drop constraints, it would be prudent to select a particular common gauge of wire.

In such a pre-wired installation, a single wire size or gauge can be chosen to accommodate about 85% of all circuits in the airplane; also the selection should be toward a lighter gauge rather than a heavier gauge wire. Where larger current requirements are required, it would be a simple expedient to parallel two wire and to accomplish equivalent paralleling on the programmable matrix boards. The plurality of arrows radiating from each of the junction boxes 10 represent all of the various end point uses at the particular location connected to that box.

The versatility of the invention from the systems viewpoint should now be evident. If it is desired to run a circuit, for example, from the flight deck to the empennage, it is a simple matter to make the appropriate interconnections on the appropriate matrix boards.

Figure 4:
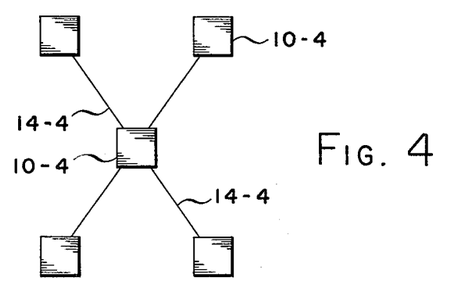

The system of the invention is not limited to a ring circuit. FIG. 4 shows a plurality of boxes 10-4 interconnected by a plurality of cables 14-4 in a radial feeder configuration wherein a number of remotely fed junction boxes are connected to the middle box 10-4. The central box in this configuration would of course be larger than the satellite junction boxes. The satellites might have four to six ZIFs only, while the central locaton might have a larger junction box with perhaps eight to twelve ZIFs of the same or larger sizes. This same logic applies to FIG. 1 wherein, for example, the flight deck capacity might be larger than the aft end capacity.

Figure 2:
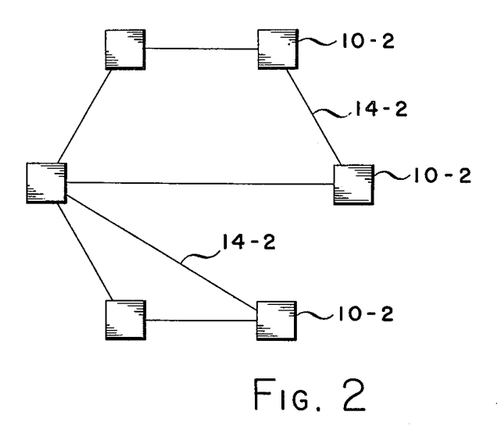
FIGS. 2 through 5 are schematic diagrams of other systems with which the invention may be used.
Figure 3:
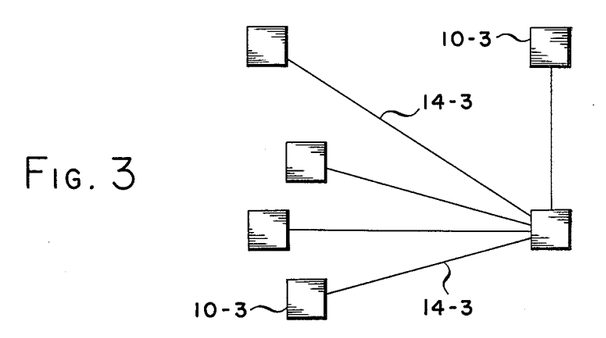

In FIGS. 2, 3 and 4, arrangements of junction boxes 10-2, 10-3 and 10-4 respectively are shown as they might be laid out to serve oddly shaped installations. In FIG. 2 there is essentially one large ring arrangement and one small ring arrangement which are brought together at a single junction box 10-2 on the left hand side.

Figure 5:
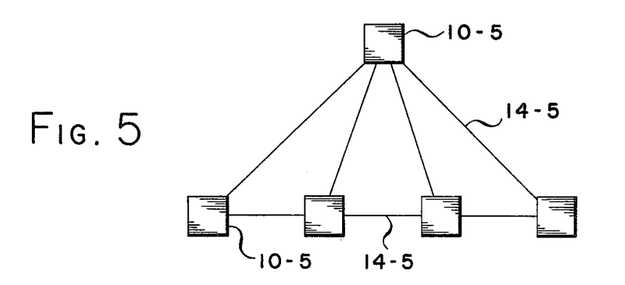

In FIG. 5, the boxes 10-5 are laid out to service a system wherein the strategic locations are to communicate with one another as well as to a central point. The cables 14-5 interconnect these boxes as shown to accomplish this desideratum. Therein, the uppermost junction box serves as a common point for a rearrangement and a satellite arrangement.

Thus, it can be seen that the system of the invention is amenable to virtually any sort of wiring scheme, and it can accommodate junction boxes of various wire capacities.

Figure 6:
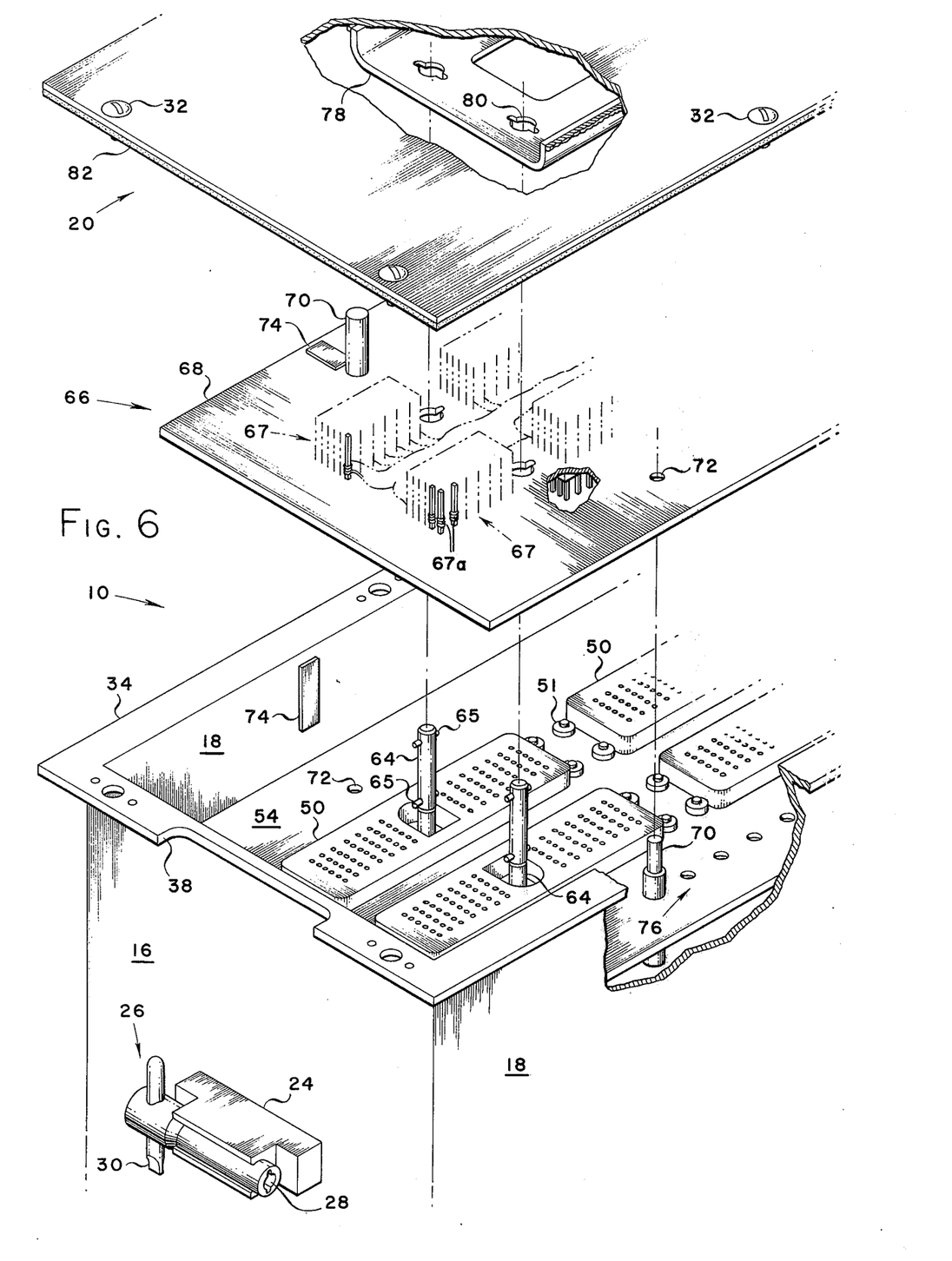
FIG. 6 is an end perspective view of a junction box embodying the invention, with the lid and matrix board both "exploded" up away from the box and with some parts broken away and in cross-section for the sake of clarity.
Figure 7:
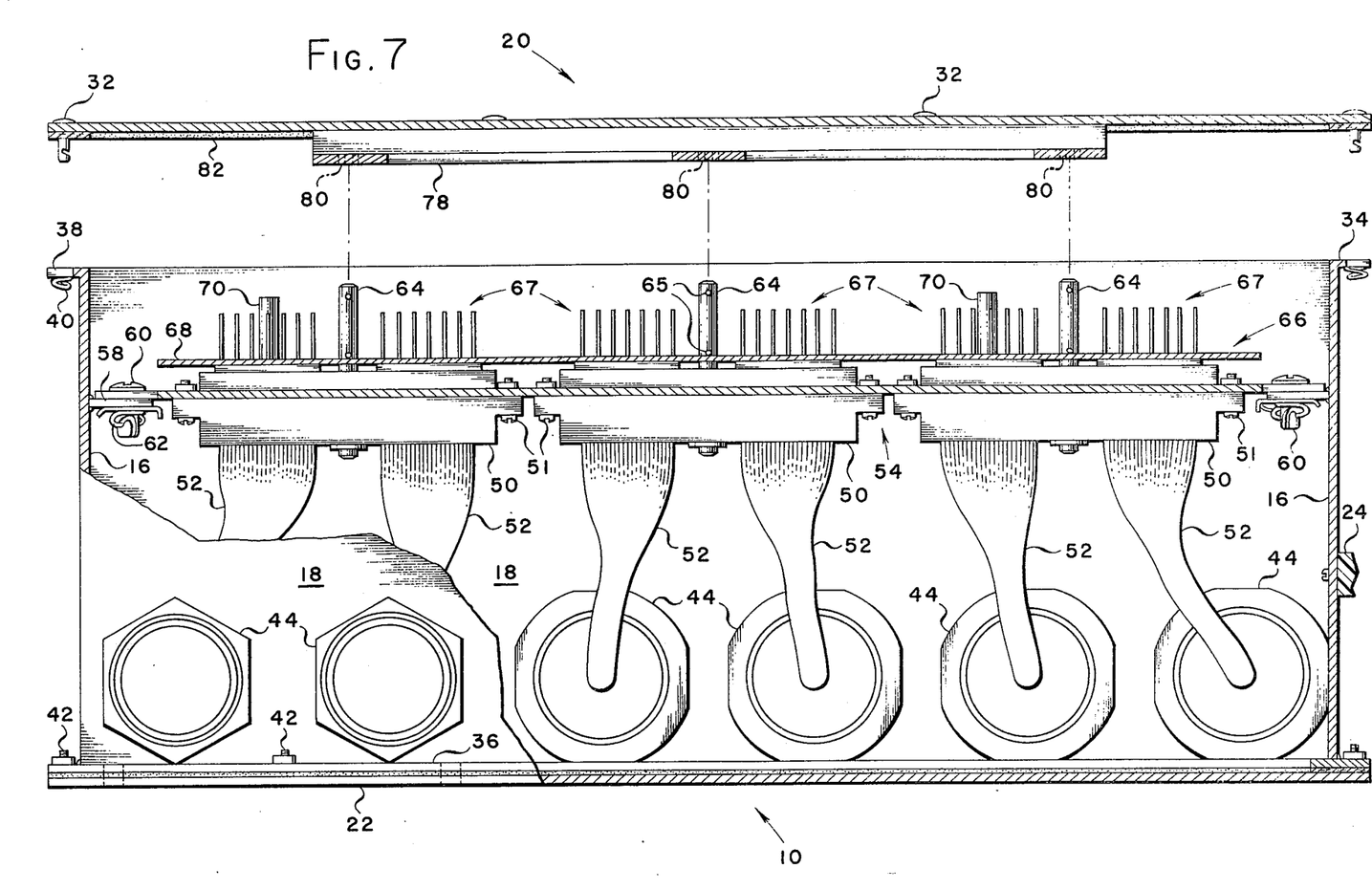
FIG. 7 is a side elevation view mostly in cross-section longitudinally through the box with the lid only "exploded" away from the box.
Figure 8:
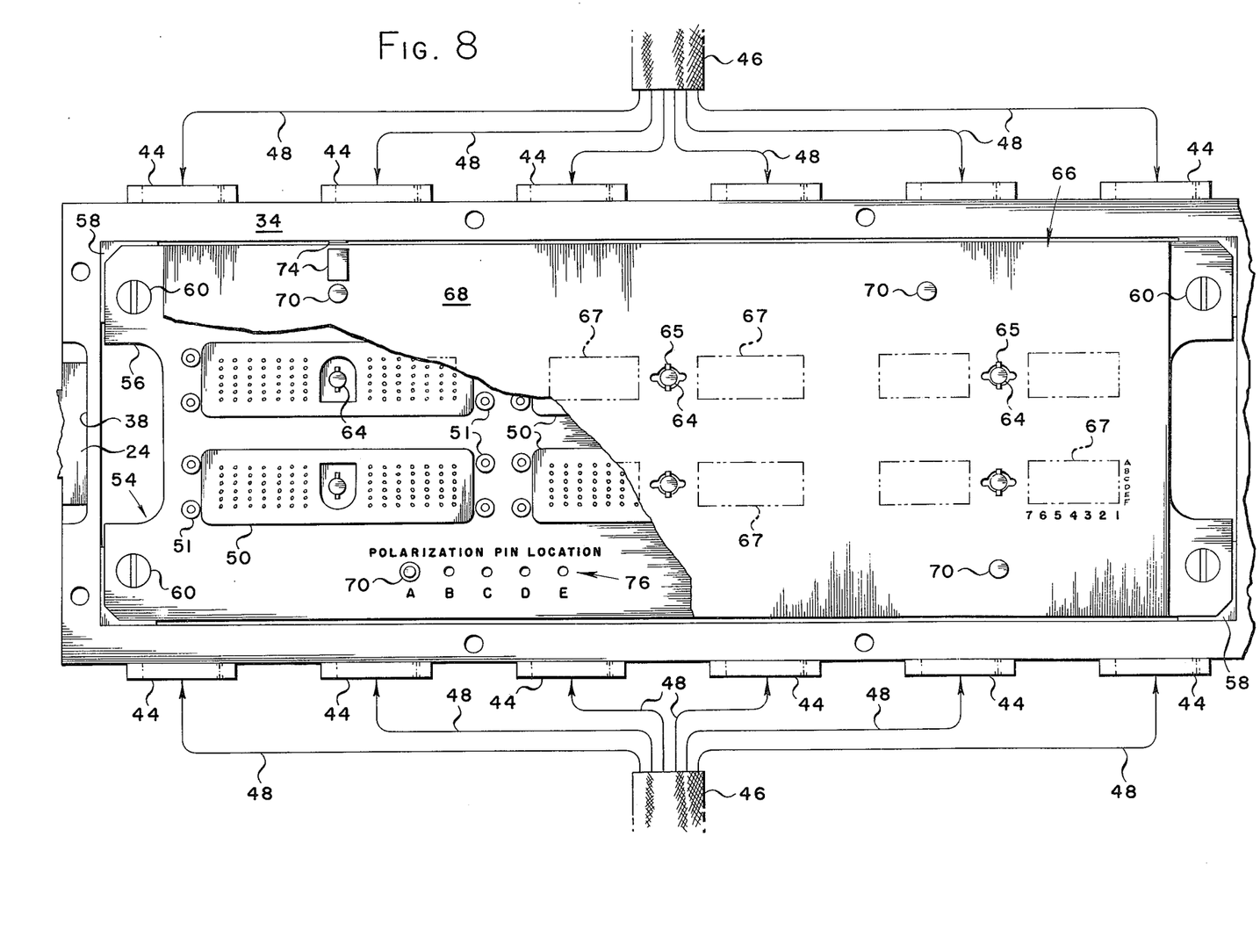
FIG. 8 is a top plan view looking down into the box with the lid removed and with the matrix board partly broken away to show the underlying mother board.

Referring now to FIGS. 6 to 8, there is shown one of the junction boxes 10 of the previous FIGS. in greater detail. Box 10 comprises a pair of end walls 16, a pair of side walls 18, a lid 20, and a bottom wall 22. One end wall 16 carries a formed clamp 24 made of a suitable resilient plastic material. This clamp is provided as a convenience and carries a tool 26 having a socket end 28 which operates the shafts of the ZIFs described below, and has a screwdriver blade 30 at its opposite end for opening the quick attach/detach devices 32 which secure the lid 20 in cooperation with appropriate devices 40 fixed to the underside of the upper end flanges 34. The side walls and end walls 16 and 18 are all provided with flanges 34 at the upper end and flanges 36 at the lower end. The upper flanges 34 at the side walls 16 are cut out as at 38 to facilitate lifting the lid 20.

To open the box, it is necessary only to take tool 26 and use the blade 30 to turn member 32 a quarter turn or as required to thereby open retaining means 40. The lid may be then lifted off by its end portions which overlie the flange cutouts 38.

In a production embodiment, the tool 26 may be attached by a nylon cord to a retractable tape assembly mounted in the general area of the clamp 24 on the outside of the box.

The bottom wall 22 is held onto the lower flange 36 by means of short, high lead angle screws 42 in cooperation with threaded openings in the bottom wall in a conventional manner. Additional holes are provided in the bottom flange by which the entire box may be fixed to other structure.

The cables to be interconnected in box 10 are brought thereto via conventional connectors 44 in the side walls. In this prototype, connectors 44 were of the hermetically-sealed round type, which are standard in aviation. The cable harnesses 46 which connect to connectors 44 may be prefabricated and mounted in an aircraft or other installation without regard to the end point uses and requirements. The connection of wires 48 to the connectors 44 is accomplished by pushing the crimped pins into the pin receptacles of the connector; a simple plastic tool is used to remove the pins is required, all in the known manner.

The term "point of use" as used in the specification and claims herein shall be understood to mean any device, such as a relay, actuator, motor-pump, motor-fan, or other utilization device. Also, the end points may include connections to power supplies or the like, which are available at discrete points in the installation.

The invention is easily capable of cooperation with any kind of wiring system. For example, flat wiring of the type described in U.S. Pat. No. 3,701,964, Flat Cable Electrical Wiring System, by the present inventor, and assigned to the same Assignee as the present invention, could be used in lieu of or even in combination with the round connectors 44 used in the prototype. One side wall 18 could be fitted with round cable connectors, and the opposite side with flat cable connectors of any commercially available type.

In this same regard as to versatility, the invention can be used without the external enclosure shown. That is, the combination of the mother board, the matrix board, and the interconnecting ZIF connectors alone does have its own utility without the external box. For example, this three-part combination could be mounted outboard of a conventional avionics rack, and the rear side connectors from the avionics "black boxes" could be brought to the rear side of the ZIF connectors. The invention would be used to interconnect such "black boxes" to each other within the rack. Effectually, the invention in such case would serve to bring the back side of the avionics rack to a more accessible location, such as to the front and above or to the side of the rack, or even to some remote location.

Thus, it can be seen that a single invention junction box has utility separate from systems such as are shown in FIGS. 1 through 5. For example, a single junction box could be mounted on the firewall of an automobile, or inside the engine compartment. The programmable matrix board in this case would be changed to accommodate variations within the same models; or between different models, or between different cars.

The external connectors 44 are joined to the underside of the discretely located ZIF connectors 50 by short interconnecting wire harnesses 52. Flat cable could be substituted for harnesses 52, as is evident. The ZIF connectors are fixed in accurate machined cutouts in the mother board 54 by suitable nut and bolt assemblies 51. The ends of the board 54 are cut out as at 56 to facilitate grasping the mother board to remove it from the box as required. Board 54 is held in place in the box on suitable ledges 58 and is secured by quick attach/detach fasteners 60. The parts 60 and 62, provided to hold the mother board in the box, are identical in concept and may be similar in construction to parts 32 and 40 which hold the lid on the box.

The mother board 54 is shown symmetrically mounted on its support ledges 58. Such a mounting in the prototype with its possiblity of putting the board in the box reversed is immaterial in that all of the wiring is symmetrical both front-to-back and side-to-side. In other installations wherein the input wiring is asymmetrical, one of the quick disconnects 60 could be moved to an asymmetrical position on its ledge, whereby the mother board would fit in the box in only one predetermined and the correct position.

The prototype shown in the drawings used six ZIF connectors, each having a capacity of 26 rows of 7 pins each; i.e., 182 pins in all. However, only 12 rows are used so this box 10 has a total maximum capability of 504 wiring points. The particular ZIF connector 50 used in the prototype was manufactured by ITT Cannon Electric of Santa Ana, Calif., known as their Model "DL" and is available with various numbers of pins. This connector is the subject of U.S. Pat. Nos. 3,587,037 and 3,594,698, issued to John W. Anhalt, and assigned to ITT (Cannon Electric), and thus need not be described in any greater detail herein. The disclosures of said ZIF connector patents identified above are hereby incorporated by reference as if herein set forth in full to the extent necessary to support the claims of this application. The Cannon ZIF connector is the only one presently commercially available, but it is thought that competing ZIF connectors will appear on the market in due time, and it is thought that the invention could be used with such other connectors when and if they do become available.

Each ZIF connector 50 has an operating shaft 64 which extends from the motor board through a suitably formed clearance opening in the matrix board, and finally terminates at an easily accessible location thereabove at the open top of the box. Each shaft 64 carries a tandem pair of "bayonet"0 type cross-pieces 65. Referring to FIG. 1 of said ITT Cannon U.S. Pat. No. b 3,594,698, it can be seen that the shaft (part 62) of the receptacle portion (part 16) has been reversed in part 16 and an insert similar to the insulator (part 28) has been provided about; moving contacts (part 152) to move therewith, in order to accommodate its use in the invention The connectors 50 shown in the drawings are in fact only the operating half (part 16) of the complete ZIF connector as sold by ITT Cannon Electric. The other normal mating half (part 14) is omitted in the invention as it is functionally provided by the matrix board 66.

Matrix board 66 comprises a flat base member 68. Means are provided to polarize the board; i.e., to insure that it can mate to the mother board 54 in only one and the correct manner. To this end, board 68 carries four pins 70 which are asymmetrically mounted in the board 68, and which fit snugly into mating openings 72 in the mother board. Although the matrix board cannot be installed incorrectly, visual means are provided to check correct registry, and to this end, two pieces of high visibility tape material 74 are provided, one on the matrix board and one in juxtaposition to it on the adjacent side wall of the box. Further, means are provided to give a visual indication of the state of modification or the like of the particular matrix board and program means thereon. Mechanical "revision" pins also insure that only that correct up-dated board can be mounted in the box. A notation on the matrix board also apprises the user that different color interconnect wire may be used for each update, where the program means are in the form of wire. To this end, one of the pins 70 is preferably carried by the mother board, rather than by the matrix board, and as the matrix board is changed, this movable pin or modification indicating pin 70 is moved from one to the next of a set of prepared openings in the mother board 54, and a new opening for that pin in the set of openings 76 is thereby automatically mated. That is, the holes are pre-drilled in the mother board thereby eliminating the need to drill and produce metal chips in the box itself, and only one of the prepared holes A through E is unlocked at any one time to mate with the present location of the indexing pin 70. Further, the pins 70, which extend to both sides of the board, also serve as legs upon which to stand the matrix board when it is not in the box, to thereby protect the pins.

Additionally, the operating shafts 64 pass through mating openings in the matrix board to help in registry between the boards. The shafts 64 each carry two cross-pieces by "bayonets", one to contact the matrix board to aid in mother it in place, and the other to cooperate with the shaped interlock openings 80 in bracket 78, described below. The two openings, one in the matrix board and the other in the lid interlock, which cooperate with two cross-pieces on the ZIF operating shafts, are turned ninety degrees with respect to other. The two cross-pieces are parallel to each other, and the matrix board opening passes the lower bar only when the ZIFs are unlocked, and then uses it to lock the matrix board down. The webbed member accepts it upper cross-piece only when the ZIF shafts are locked.

invention.

The essential elements of the invention are a mother board carrying ZIF connectors which mate with the matrix board, plus means to permit this mating to occur with essentially zero insertion force, and means to lock the terminals and boards together. The additional concepts as to the matrix board includes the programmability feature provided, for example, in this prototype, on the wire wrap posts on one side of the board, which also feed through to the other side of the board to provide the pins that interface/mate with the ZIF connectors. Thus, it can be seen that the external box is not essential to the invention, as set forth above. The groups of pins 67 shown in the drawing, which is the prototype, are of 0.025 inch square cross-section, and are adapted to make wrapped wire connectors as shown.

The term "program means" and the like as used in the specification and claims herein shall be understood to include all interconnection means amenable to use with the invention matrix board. Wire wrapping 67a, as shown in the drawings, is preferred because of its well-developed state, its flexibility to permit several circuits or layers on each pin, and the like. However, other techniques, welding types, PCs, etc., as mentioned above, fall within the scope of the invention and may be used in place of, and in combination with, each other on the program side of the matrix board.

The invention is amenable to further additions lending further versatility. For example, the matrix board itself could be entirely or partly a printed circuit board, which would be, conceptually, internal programming rather than external programming. Further, flexible printed circuits could be used in cooperation with some or all of the additional pins on the program side of the matrix board. In such case, the programmed means would overlie and be in addition to wire wrapped or other program wiring, or could be used in addition to a single or multiple layered printed circuit board used as the matrix board.

In the prototype, the matrix board was made of aluminum, and plastic insulators were provided to insure electrical isolation of the pins as they passed through the plate. With other types of feed-through pins, the insulation may be in the form of a sleeve of dielectric composition formed over each pin, or other well known techniques could be used.

Means are provided to prevent lid 20 from closing the box unless and until all the operating shafts 64 are in their correct locked position. To this end, lid 20 carries a webbed bracket member 78, which is welded or otherwise attached to the underside of the lid. Member 78 carries a plurality of openings 80 which are configured to accept the ends of the operating shafts 64 only when they are in their locked position. The modified ZIFs used in the prototype had a double bayonet-type operating end as described above. A gasket member 82 is provided around the edge of the lid to serve as both a liquid seal, but this could equally be an RF type screen seal. A similar gasket is provided between wall 22 and its flanges for the same reasons.

While the invention has been described in detail above, it is to be understood that this detailed description is by way of example only, and the protection granted is to be limited only within the spirit of the invention and the scope of the following claims.

I claim:

1. A wiring system for an installation having a plurality of points of use concentrated in at least two locations comprising:
   at least one programmable junction means at each of said locations, said junction means comprising,
      a mother board having
         a plurality of discrete connector means upon one side thereof and mounted for accessibility at its opposite side, and
      a matrix board having
         means, complementary to said discrete connector means, to interconnect said discrete connector means at an opposite side of said mother board with one side of said matrix board,
         program means on the opposite side of said matrix board for selectively interconnecting said complementary means, and
   means to selectively lock and unlock said means to interconnect between said mother board and said matrix board;
   means to connect the points of use at each said location to said at least one junction means at each said location; and
   conductor means interconnecting said junction means via said discrete connector means.

2. The system of claim 1, wherein each of said junction means comprises a junction box housing said mother board and said matrix board, and said conductor means including connectors mounted in a wall of said box and wiring extending from said connectors to said one side of said mother board.

3. The system of claim 2, at least three of said junction boxes, and wherein said junction boxes are arranged in a continuous ring of communication.

4. The system of claim 2, at least four of said junction boxes, wherein said junction boxes are arranged in a radial array around a central junction box and said central box has a larger circuit capacity than any one of the other three boxes.

5. The system of claim 1, wherein each individual conductor in said conductor means is of a minimum power carrying capacity, and means in said matrix board to parallel two or more of said minimum capacity conductors via said programmable junction means to obtain an effective conductor of sufficient capacity to serve a point of use requiring a power carrying capacity larger than said minimum capacity.

6. The system of claim 1, wherein said means to interconnect comprises at least one substantially zero insertion force connector mounted on said mother board and terminals mounted on said one side of said matrix board, said terminals being cooperable to mate with the terminals of said zero insertion force connector.

7. The system of claim 1, and means to assure registry between said mother board and said matrix board in only one predetermined relationship comprising pin means asymmetrically mounted between said boards in combination with said interconnecting means.

8. The system of claim 1, wherein at least a portion of said program means comprises wire wrap posts extending from said opposite side of said matrix board, and interconnect wires around selected ones of said posts to thereby accomplish a programmed interconnection between individual ones of said conductor means.

9. The system of claim 1, said program means comprising a plurality of individual wires welded to portions of said interconnecting means disposed on said opposite side of said matrix board.

10. The system of claim 1, wherein at least a portion of said program means comprises printed circuit means.

11. The wiring system of claim 1, wherein,
each of said discrete connector means comprises a split, operating component actuatable by said means to selectively lock and unlock for making and breaking electrical contact, and
said means to interconnect comprises a plurality of groups of pins extending from said matrix board to interface and mate with said discrete connector means.

12. A system for wiring an aircraft having a plurality of end point uses concentrated in at least two locations in said aircraft comprising:
at least one programmable junction means at each of said locations,
said junction means comprising a junction box having
an external housing,
a mother board,
means to mount said mother board in said housing,
a matrix board, and
means to mount said matrix board on said mother board independent of said housing;
conductor means interconnecting said junction means and having a circuit capacity larger than the circuit requirements of the aircraft, including its anticipated future growth, and comprising prefabricated wiring harnesses;
means to connect all of said conductor means located at one of said junction means to one side of said mother board;
means to interconnect the opposite side of said mother board with one side of said matrix board;
means to connect the points of use at each of said locations to said at least one junction means at said location via said conductor means, including connections of the individual wires in said harnesses to said mother board through a wall of said housing;
means to selectively lock and unlock said interconnection means between said mother board and said matrix board;
program means on the opposite side of said matrix board;
a lid for said housing; and
an interlock means to prevent said lid from closing said housing unless and until said matrix board is in proper relationship on said mother board and said interconnection means are locked.

13. Means for selectively interconnecting a plurality of input electrical conductors comprising:
a mother board;
a matrix board;
a plurality of separate connectors, upon said mother board, through which all of the input electrical conductors are connected to one side of said mother board;
means to interconnect the opposite side of said mother board and said connectors with one side of said matrix board;
means to selectively lock and unlock said interconnection means between said boards such that electrical circuits are operative therethrough when locked and inoperative when unlocked; and
program means on the opposite side of said matrix board for selectively interconnecting regions thereof electrically engageable with said connectors;
whereby various combinations of selected ones of said input conductors are connected to each other via said program means on said matrix board.

14. The combination of claim 13, and means to assure registry between said mother board and said matrix board in only one predetermined relationship.

15. The combination of claim 14, wherein said registry means includes said interconnecting means and asymmetrical pin means disposed between said boards.

16. The combination of claim 13, wherein at least a portion of said program means comprises wire wrap posts extending from said opposite side of said matrix board, and interconnect wires wrapped about selected ones of said posts to thereby accomplish said selected interconnection of said input conductors.

17. The combination of claim 13, wherein said program means comprises a plurality of individual wires welded to portions of said interconnecting means disposed on said opposite side of said matrix board.

18. The combination of claim 13, wherein at least a portion of said program means comprises printed circuit means.

19. The combination of claim 13, wherein said program means comprises a flexible printed circuit mounted on said opposite side of said matrix board.

20. The combination of claim 13, wherein said means to interconnect comprises at least one substantially zero insertion force connector mounted on said mother board and terminals mounted on said one side of said matrix board, said terminals being cooperable to mate with the terminals of said zero insertion force connector.

21. Means for selectively interconnecting a plurality of input electrical conductors, the combination comprising:
an external housing;
a mother board and a matrix board;
means mounting said mother board in said housing;
connector means to connect all said input conductors to one side of said mother board through a wall of said housing;
means to mount said matrix board on said mother board independent of said housing;
means to interconnect the opposite side of said mother board with one side of said matrix board and to selectively lock and unlock said interconnection means between said boards;
program means on the opposite side of said matrix board, whereby various combinations of selected ones of said input conductors are connected to each other via said program means on said matrix board;
a lid for said housing; and
interlock means to prevent said lid from closing said external housing unless and until said matrix board is in proper relationship on said mother board and said interconnection means are locked.

22. The combination of claim 21, said interconnection means including at least two substantially zero insertion force connectors, each of said zero insertion force connectors having an operating shaft which carries a pair of bayonet cross-pieces thereon in tandem, said matrix board being formed with shaped openings to pass said bayonet cross-pieces only when said operating shafts are in their open position, and said interlock means being formed with shaped openings to pass the upper ones of said bayonet connections only when said operating shafts are in their locked positions.

23. The combination of claim 21, said interconnection means includes at least one substantially zero insertion force connector, an operating shaft on said connector extending through a suitably formed opening in said matrix board, said interlock means comprising a webbed bracket member on the inside of said lid, and said bracket member being formed with at least one shaped opening to accept the operating shaft of said at least one said connector only when said at least one connector is in its locked position.

24. In combination;
a mother board carrying the operating portion of at least two zero insertion force connectors;
a plurality of input wires connected to the terminals in said zero insertion force connectors on one side thereof;
a matrix board having terminals cooperable with and securable to the terminals in said zero insertion force connectors on the other side thereof,
program means on an opposite side of said matrix board for interconnecting predetermined ones of said terminals on said matrix board; and
registry means to assure that said mother board and said matrix board fit together in only one predetermined relationship,
said registry means comprising pins interposed between said mother board and said matrix board and including at least one operating shaft extending through a suitably formed opening in said matrix board and actuating said zero insertion force connector in and out of electrical engagement with said matrix board terminals, whereby said boards are locked together and electrically connected after the terminals of said matrix board are fitted to the mating terminals in said connector board by manipulation of the operating shaft.

25. The combination of claim 24, and a junction box to house all of said aforementioned parts, connector means in said junction box for connection to groups of said input wires, means to mount said mother board intermediate said connector means and the access opening of said box, and cable means interconnecting the inside of said connectors with said terminals in said zero insertion force connectors.

26. The combination of claim 25, wherein said last mentioned cable means comprise flat cable.

27. The combination of claim 25, wherein said last mentioned cable means comprise bundles of individual round electrical conductors.

28. The combination of claim 24, wherein said pins are longer than said terminals and larger than said program means and extend to both sides of said matrix board, whereby said pins also serve as legs for said matrix board when said matrix board is outside of said box.

29. The combination of claim 24, said program means comprising wire wrap terminal posts extending from said matrix board to the side thereof opposite said terminals thereon, and wires wrapped about said posts to thereby perform said programmed interconnections of selected ones of said terminals.

30. In combination;
an external housing;
a mother board carrying the operating portion of at least one zero insertion force connector;
means mounting said mother board in said housing;
a plurality of input wires connected to the terminals in said zero insertion force connector;
connector means to connect said input wires to said mother board through a wall of said housing;
a matrix board having terminals cooperable with and securable to the terminals in said zero insertion force connector on one side thereof;
means to mount said matrix board on said mother board independent of said housing;
program means for interconnecting predetermined ones of said terminals in said matrix board;
registry means to assure that said mother board and said matrix board fit together in an intermediate location in only one predetermined relationship, said registry means comprising pins interposed between said mother board and said matrix board and includes at least one operating shaft of said zero insertion force connector which extends through a suitably formed opening in said matrix board, whereby said boards are locked together after the terminals of said matrix board are fitted to the mating terminals in said connector board by manipulation of the operating shaft;
a lid for said housing; and
interlock means to prevent said lid from closing said housing unless and until said matrix board is in proper relationship on said mother board and said zero insertion force connector is locked.

31. The combination of claim 30, at least two of said zero insertion force connectors, each of said zero insertion force connectors having an operating shaft which carries a pair of bayonet cross-pieces thereon in tandem, said matrix board being formed with shaped openings to pass said bayonet cross-pieces only when said operating shafts are in their open position, and said interlock means being formed with shaped openings to pass the upper ones of said bayonet connections only when said operating shafts are in their locked positions.

32. The combination of claim 30, said interlock means comprising a webbed bracket member on the inside of said lid, and said braket member being formed with at least one shaped opening to accept the operating shafts of said at least one zero insertion force connector only when said at least one connector is in its locked position.

* * * * *